Figure 1:
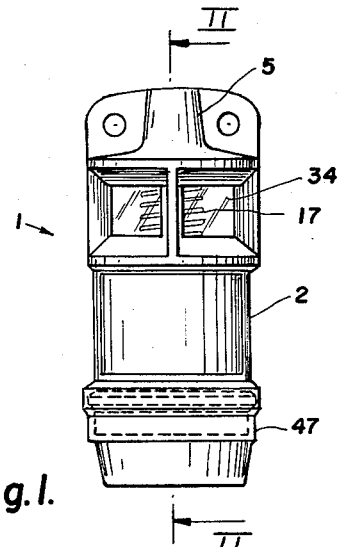

May 25, 1965   J. A. STEIN   3,185,041
FILTER GAUGE
Filed Oct. 15, 1962

INVENTOR.
JOSEPH A. STEIN
BY
Christy, Parmelee & Strickland
his ATTORNEYS

United States Patent Office 3,185,041
Patented May 25, 1965

3,185,041
FILTER GAUGE
Joseph A. Stein, Pittsburgh, Pa., assignor to Bacharach Industrial Instrument Company, Pittsburgh, Pa., a corporation of Pennsylvania
Filed Oct. 15, 1962, Ser. No. 230,665
6 Claims. (Cl. 92—94)

This application is a continuation-in-part of my co-pending application Serial No. 854,294, filed November 20, 1959, now Patent No. 3,066,527.

The present invention relates generally to recording gauges and specifically to an improved form of gauge to be mounted between an air filter and a mechanism drawing air through said filter for any purpose. Such a gauge is constructed to record the increasing clogging of the filter by accumulation of dirt thereon, through increasing resistance to passage of air through the filter while the mechanism is operating and to return to zero position when the mechanism is not operating. However, when said resistance reaches a predetermined amount such as to impair the desired efficiency of operation of the mechanism, the gauge permanently displays a signal showing need for cleaning or replacing the filter.

Such a gauge finds many uses in industry, one of which is to record the degree of clogging of air filters mounted in the air intake of automotive internal combustion engines. By mounting the gauge upon the air intake manifold between the carburetor and the air filter enclosure, anyone raising the hood of the vehicle can determine by a glance at the gauge the increasing suction imposed within said manifold by the operating engine pistons, during the air intake stroke thereof, or by a permanently displayed signal, during non-operation, indicating a need for changing the filter. For these reasons the gauge will be described as to its functions when so mounted.

Since substantial deviations in the amount of combustion air supplied internal combustion engines materially affects their efficiency and the amount of fuel consumed during movement of the vehicle over a stated distance or under varying road conditions, it is desirable to have a standard form of gauge which may be readily modified as to permanently display the aforesaid signal for filter change under different manifold suction pressures. One such means for effecting such modifications is to use a coil spring loaded signal displaying member and to vary the compression characteristics of the spring so as to accommodate varying manifold suction before permanently displaying the filter change signal.

Where, as in the present invention, a rubber diaphragm and other gauge parts cooperate with the foregoing coil compression springs, these cooperating gauge parts must be constructed to minimize wear or friction between them to avoid false gauge readings.

One object of the present invention is to provide an improved form of diaphragm, target cup and spring assembly in such a gauge.

Another object is to provide an improved form of diaphragm which will function with a minimum of friction, rubbing or chafing during operation.

Figure 4:
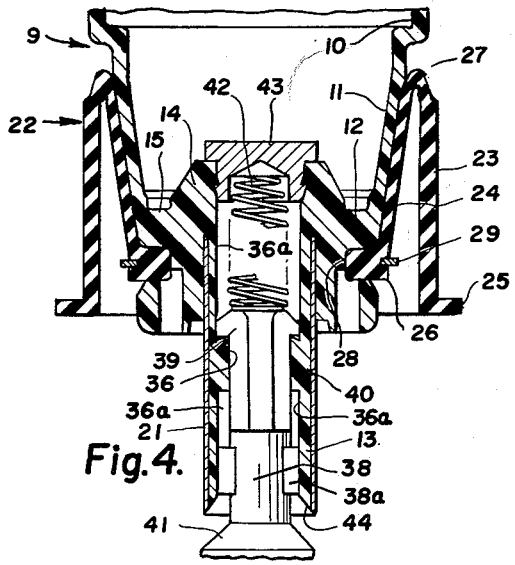
Figure 2:
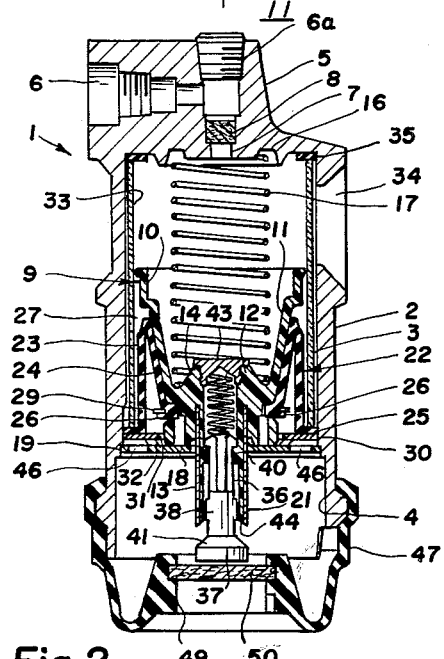
Figure 3:
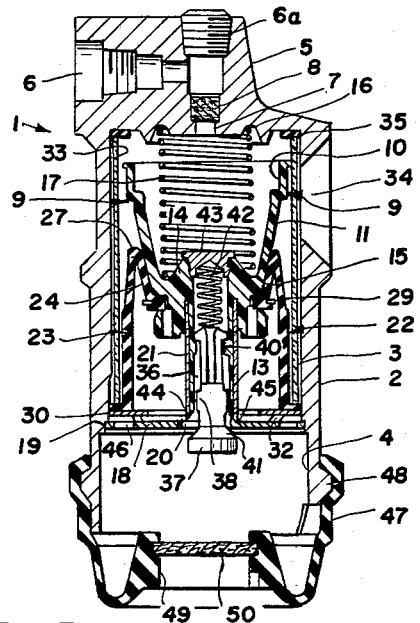

These and other objects of the invention will be made apparent from the following description and the drawing forming a part thereof, wherein:

FIG. 1 shows in elevation the gauge of the invention;
FIG. 2 shows a vertical cross-section taken on lines II—II of FIG. 1 illustrating the position of the gauge parts when the engine is not operating;
FIG. 3 shows a cross-section through the gauge as in FIG. 2, with the gauge parts in position to permanently display the change filter signal;
FIG. 4 shows an enlarged view of the diaphragm, target cup and compression spring as positioned in FIG. 2; and
FIG. 5 shows in vertical cross-section the diaphragm prior to being inwardly collapsed into the position shown in FIG. 4 and attachment to the cup member.

Referring now to the drawing and specifically FIGS. 2 to 5 inclusive, the gauge, indicated generally as 1, is provided with an elongated body 2 having an internal cylindrical opening 3 therein, which is open at one end and closed at the opposite end by a gauge head portion 5. Head portion 5 has one or more openings 6 and 6a therein for connecting the gauge with an engine air intake manifold (not shown), both such openings 6 and 6a have a common connection 7 with the interior of the cylindrical body opening 3. Preferably a suitable filter 8 is disposed in opening 7 and may be of porous metal or other suitable material. One such opening 6 or 6a, when not used, may be closed by a suitable means such as a pipe plug. The gauge body may be of any suitable material, including aluminum die casting or molded plastics. Upon one face of the body portion 2, a suitable window opening such as 34 will be provided for viewing the moving gauge portion, as hereinafter discussed.

Figure 5:
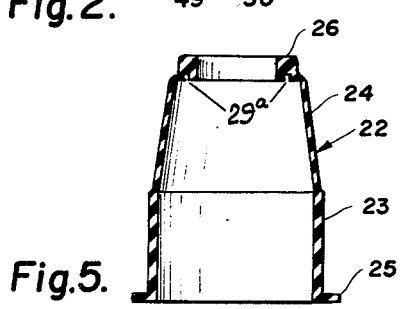

Within the gauge body opening 3 are disposed the moving gauge parts shown in FIGS. 2 and 3 and also in enlarged detail in FIGS. 4 and 5. Centrally of body opening 3 is disposed the generally cup shaped member indicated generally at 9 and comprised of a rim portion 10, downwardly converging side walls 11 and a bottom wall 12 having formed therewith a depending portion 13. Concentric with portion 13 and extending above wall 12 is a portion 14 joining with wall 12 to form a circular recess 15. Concentric with recess 15 and within gauge head portion 5 is a recess 16. A helical spring 17 has its opposite end mounted in said recesses 15 and 16 and is designed to compress sufficiently to constantly display the cup rim 10 and a signal thereof under a predetermined suction applied to the cup through said inlet openings 6 or 6a. A circular plate 18 is staked within the body opening 3 upon shoulders 19 and provides vertical support for the cup shaped member 9. Plate 18 has a central passageway 20 therethrough receiving cup depending portion 13 and a plurality of circumferentially spaced openings 46. Encircling cup depending portion 13 may be a reinforcing tube 21 having its inner end embedded in cup bottom wall 12.

Enclosing the intermediate portion of cup member 9 is the collapsible diaphragm best shown in FIGS. 4 and 5 and indicated generally at 22 and comprised of a thickened semi-rigid outer straight portion 23 and a thinner flexible converging inner portion 24. As shown, the diaphragm portion 23 is of hollow cylindrical shape terminating at one end in a circumferential flange 25 and at the opposite end in converging flexible walls 24 which terminate in a circumferential flange 28. As illustrated in FIGS. 4 and 5, the thinner more flexible diaphragm walls 24 are collapsed within outer diaphragm portion 23 with the inner ends of walls 24 forming a partial extension of walls 23 and thereafter turning inwardly at 27 to enclose the similarly shaped cup portion 11. The diaphragm flange 26 is received in recess 28, FIG. 4, of cup portion 12. A conventional locking ring 29 is received in flange 26 and imposes a compressive force thereon, retaining the flange 26 within cup recess 28. The diaphragm outer flange 25 is supported upon a plate-like circular member 30 having a central aperture 31 therein receiving the lower portion of cup portion 12 and provided with depending portions 32 supported upon member 18. The said portions 32 may be flexible. Encircling the said cup 9 and diaphragm 22, is a cylindrical member 33 disposed within gasket body opening 3 and closing the window opening 34 of body 2. Member 33 is of transparent material and has its lower peripheral edge seated upon diaphragm flange 25 and its upper peripheral edge abutting a suitable sealing gasket 35 seated against the adjacent face of gauge head portion 5.

The cup depending portion 13, extending downwardly through aperture 20 of plate member 18, has a central cavity 36 extending therethrough and through cup portion 12. At two diametrically opposite sides of cavity 36, above and below portion 40 thereof, are recesses 36a. Within cavity 36 is disposed the gauge resetting means. Such resetting means comprises a reset button having a head portion 37, a stem portion 38, freely movable longitudinally within cavity 36 of cup portion 13, and terminating at its inner end in outwardly extending spaced deflectable portions 39 engaging with annular portion 40 of cavity 36. Head portion 37 is connected to stem portion 38 by converging portion 41. Above stem portions 39, is a suitable compression spring 42 having its lower end seated upon stem portions 39 and its upper end seated within a closure cap 43 received in the upper end of cavity 36. The lower end of cup portion 13 is provided with inwardly converging surfaces 44 adapted to engage over at least one of a plurality of upstanding lips 45 about the periphery of opening 20 in member 18. It will also be noted member 18 has circumferentially spaced openings 46.

As shown in FIGS. 2 and 3, the lower portion of gauge body 2 is open, and if desired a protective hollow rubber boot 47 may be mounted over the open end of the body 2 and embracing head 48 thereof. Boot 47 is provided with a central opening 49 extending therethrough and within which is mounted a suitable porous filter member 50 through which air is passed by atmospheric pressure.

In use, as previously stated, the gauge is suitably connected with the interior of an air intake manifold of an internal combustion engine or other device by a tube, or other means (not shown), seating at one end in opening 6. Assuming a new or clean air filter is mounted in the air feed passage to said manifold, the gauge cup and diaphragm would be positioned as illustrated in FIG. 2 when the engine is not operating. The spring 17, seating in the said gauge cup, will be of suitable resistance to require a predetermined suction force through gauge inlet 6 to raise cup 9 a sufficient distance against the spring resistance to withdraw cup depending portions 13 and 26 through opening 20 of member 18 until surfaces 44 on member 13 engage over a lip 45 of member 18 and prevent return of member 13 through the opening 20 when said suction force is reduced. When this degree of cup movement occurs the upper portion 10 of cup 9 is continuously displayed within the gauge body window 34 along with any suitable signal such as wording or a colored band mounted upon the outer face of the cup portion 10. Preferably such wording or colored band would be in luminescent ink or paint.

During operation of the gauge, as when the engine to which it is attached is running, the cup 9 reciprocates between the positions shown in FIGS. 2 and 3 in accordance with the air volume demands of the engine. When the air intake filter is new and clean there may be little or no movement of the cup 9. As the filter gradually clogs with dirt, suction force within the gauge increases with the suction within the engine air intake manifold with which the gauge is connected. Since the interior of the gauge, as confined within the transparent tube 33 between gauge head portion 5 and plate member 18, is closed by the diaphragm 22, the cup 9 is exposed upon its upper surface only to suction from the said air intake manifold and only to atmospheric pressure below its attachment to the diaphragm, the pressure upon the inner surface of the cup is at atmospheric pressure when the said engine is not running. As a result, as the air filter becomes clogged to such a degree that the desired air volume for operation of the engine is not readily obtainable, the suction within the gauge increases until it passes the aforesaid predetermined amount and the cup 9 is locked in raised position.

During such reciprocation of the cup 9 within the gauge, the semi-rigid diaphragm portion 23 remains in substantially fixed position and the flexible diaphragm portion 24, embracing the cup, flexes upwardly and downwardly with the cup. Since the moving diaphragm portion is always spaced from the fixed diaphragm portion, there is no friction between them or between the cup and the diaphragm portion 24 thereby providing for long diaphragm life and accurate gauging. The spring 17, being unconfined except at the ends thereof, is free to flex with cup movement during all movements of the cup. Any tendency for deviation from straight linear movement during compression of the spring during normal operations is prevented by depending cup portion 13 and wear tube 21. When, however, the cup upward movement is such as to raise portion 13 above opening 20 of member 18, the resultant slight tilting of the cup engages the member 13 with one or more of the portions 45 of plate 18 preventing return of the cup to the position of FIG. 2 and retains the cup in the position of FIG. 3. In this position the aforesaid cup signal is continuously displayed through window 34 of the gauge body, regardless of operation or stopping of the engine. Thus anyone raising the hood of the body over the engine compartment can be forewarned of the undesirable filter conditions and that the engine will no longer operate under the desired economic or power conditions.

Referring again to FIGS. 3, 4 and 5, it is readily apparent that collapsing diaphragm portions 24 downwardly within diaphragm portion 23, as illustrated in FIG. 4, disposes portions 24 in spaced relation to the walls of portion 23. Conversely any upward movement of cup 9 from the position in FIGS. 2 and 3 towards the position in FIG. 3, moves diaphragm portions 24 from off cup walls 11 to form a converging extension of diaphragm walls 23, as in FIG. 5. Since diaphragm portions 24 were molded to converging shape above portions 23, the flexible portions 24 freely roll away from cup walls 11 and progressively reverse their position, without substantially any friction or breaking of the surface of portion 24, which might tend to restrict free upward movement of cup 9 as an increasing suction force above the diaphragm decreases the resistance of spring 17 to cup movement. After the suction force above cup 9 is reduced, the spring 17 in moving cup 9 downwardly carries the diaphragm portion 24 into collapsed position again.

Having described the invention and recited details of construction and preferred materials, it will be apparent to those skilled in the art that other known materials or new materials may be substituted for those described without departing from the scope of the appended claims.

I claim:

1. In a gauge of the character described having a central cavity therein closed at one end by a head portion having a suction inlet opening therein communicating with said cavity, the combination of an air impervious liner within said cavity and having one end of the liner sealed against said head portion and encircling said suction inlet opening, a hollow cup disposed within said liner for movement longitudinally thereof and having converging side walls connected by a transverse bottom wall, a collapsible diaphragm disposed within said liner in spaced relation to said head portion for receiving said movable cup member, said diaphragm having freely flexible inner converging side walls enclosing and aligned with said cup converging side walls and terminating at one end in an attachment to said cup bottom wall, outer semi-rigid diaphragm side walls disposed adjacent said liner and terminating in flanges extending beneath the open periphery of the adjacent end of said liner for sealing said end opening, the adjacent upper end of said outer diaphragm walls having an inwardly curved portion forming a continuation of the adjacent ends of said inner diaphragm walls, and coil spring means disposed between and abutting said head portion and said cup bottom wall within said cup side walls.

2. In a gauge of the character described having a body portion provided with a longitudinally extending cavity therein which is open at one end and closed at the opposite end by a gauge head portion provided with a suction inlet opening connecting with said cavity, the combination of means extending transversely of said cavity in fixed relation to the adjacent open end thereof, a hollow cup member within said cavity above said means for movement between said head portion and means under a suction force applied through said head inlet opening, a rim portion on said cup disposed in adjacent relation to said cavity inner peripheral walls and provided with converging side walls extending towards said means, a cup bottom wall disposed transversely over said means and connecting the adjacent ends of said cup converging side walls, a collapsible diaphragm within said cavity having a relatively thick peripheral side wall extending above said means and adjacent said cavity walls for a portion of the longitudinal length thereof, one end of said diaphragm peripheral side wall having sealing engagement with said adjacent cavity walls adjacent said means and the opposite end of said peripheral side wall terminating in a flexible peripheral wall of less thickness having converging walls turned inwardly between said thickened walls to embrace said corresponding converging cup side walls, the outer periphery of the free end of said converging diaphragm walls embracing said cup bottom portion, and a helical compression spring disposed between said gauge head portion and the interior face of the cup bottom wall.

3. The gauge as defined in claim 2, wherein said means is provided with a central opening therethrough and said cup bottom wall has a depending portion projecting through said means central opening for guiding reciprocating movement of said cup and engaging diaphragm portion longitudinally of said gauge cavity during application and release of suction to said gauge cavity above said cup.

4. A collapsible diaphragm for use with a reciprocating open top cup member having converging side wall portions and moving longitudinally of a body cavity provided with an open end sealed by said diaphragm and under a pressure differentiation upon opposite faces of the closed cup bottom wall, comprising a hollow cylindrical base portion defined by semi-rigid straight walls, means at one end of said semi-rigid walls for securing said base portion in a fixed position within said cavity, a hollow cylindrical portion forming an extension of the opposite end of said base portion semi-rigid walls and defined by flexible converging walls terminating in annular means for attachment to said cup member adjacent the bottom wall thereof, said flexible converging walls being collapsed about their connection with said semi-rigid straight walls and within the latter for reception of said cup member.

5. The diaphragm as defined in claim 4 wherein said semi-rigid walls are of substantially greater thickness than said flexible converging walls.

6. The diaphragm as defined in claim 4, wherein the said hollow contoured diaphragm is of rubber molded into a unitary structure.

References Cited by the Examiner

UNITED STATES PATENTS

| 2,178,953 | 11/39 | Chilton | 92—99 |
| 2,478,575 | 8/49 | Fitch | 92—94 |
| 2,773,511 | 12/56 | Mercier | 92—103 |
| 2,809,708 | 10/57 | Edwards | 92—100 |

RICHARD B. WILKINSON, *Primary Examiner.*

FRED E. ENGELTHALER, *Examiner.*